UNITED STATES PATENT OFFICE.

ANTON WEITHALER, OF KARLSRUHE, GERMANY.

PROCESS FOR PRODUCING SMOOTH, GLOSSY, OR GLAZED COATING ON CEMENT GOODS.

1,101,823.  Specification of Letters Patent.  Patented June 30, 1914.

No Drawing.  Application filed April 11, 1910. Serial No. 554,603.

*To all whom it may concern:*

Be it known that I, ANTON WEITHALER, a subject of the German Emperor, and residing at Karlsruhe, in the Grand Duchy of Baden, Germany, have invented a new and useful Process for Producing a Smooth, Glossy, or Glazed Coating on Cement Goods, Walls, and the like, of which the following is a specification.

When cement or cement mixtures or mortar is applied in a fluid condition to the dry and porous surface of cement, or to a dry wall or other object, the absorption of the moisture by the surface to which applied, together with the removal of the moisture by evaporation into the surrounding atmosphere, results in a dull, rough, uneven, and unsatisfactory surface, requiring further treatment, as by spattling, fixing or polishing, before a smooth, glossy or glazed surface can be obtained.

As a specific example of the method of performing the invention herein one proceeds as follows: A neat Portland cement mortar, having the consistency of an oil varnish, although obviously no oil is incorporated in the said coating mixture, is applied to the surface of the article or construction to be treated by means of a suitable spraying device, the surface being maintained moist throughout the application of the coating thereon and until the initial set has occurred. In this manner, owing to the fact that the coating is sprayed or forced upon the said surface by means of pressure, an extremely dense and even coating is obtained. Preferably the said coating is kept moist continuously until the initial set has occurred either by the direct application of water or by maintaining the same in a saturated atmosphere. As a result of this treatment a glazed-like luster is imparted to the surface and the entire body of the coating itself is extremely uniform and even. Moreover, the luster or glaze persists and remains after the process of setting is completely finished, and thereby subsequent smoothening, flattening, or polishing is rendered entirely unnecessary.

The covering material may, with advantage have a consistency of about that of oil color. It contains as an essential ingredient cement, which may be admixed with other materials to give a surface of a particular nature, as with coloring matter to give a colored surface, or with diluents, etc.

By the process of the present invention the too rapid drying or hardening or setting or evaporating of the cement applied is prevented, and the presence of the moisture in the well moistened surface to which the coating is applied, as well as the moisture in the surrounding atmosphere enables the setting of the external layer of the cement while the underneath layers are still moist, so that unevennesses are avoided, and a smooth and glossy or glazed surface is obtained.

Applicant disclaims, it not being within the scope of the annexed claims, the mere separate spraying of a mortar upon a surface to form a coating thereon, or the mere separate moistening or saturating of a mass of cement mortar applied to a wall, as by neither of these processes alone can the desired result herein obtained be accomplished, and it is solely by the combination of the pressure application or spraying of a cement mortar of the proper consistency to the surface to be treated with means for the prevention of absorption and evaporation of the contained water that the desired result can be accomplished.

I claim.

1. The process for producing a glazed-like mortar coating on the surface of a suitable base which consists in pneumatically applying a superficial coating of liquid cement mortar to the surface to be treated, in order to form thereon a dense surface layer which resists the penetration of moisture therethrough to the underlying base, and maintaining said surface layer of cement mortar sufficiently moist until the initial set has occurred to preserve a superficial gloss on the said surface layer when completely set and hardened.

2. The process for producing a glazed-like mortar coating on the surface of a cement construction which consists in pneumatically applying a superficial coating of liquid cement mortar to the surface to be treated in order to form thereon a dense surface layer which resists the penetration of moisture therethrough to the underlying base, and maintaining said surface layer of cement mortar sufficiently moist until the initial set has occurred to preserve a superficial gloss on the said surface layer when completely set and hardened.

3. The process for producing a glazed-like mortar coating on the surface of a suitable base which consists in first moistening said surface and then pneumatically applying a superficial coating of liquid cement mortar to the surface to be treated, in order to form thereon a dense surface layer which resists the penetration of moisture therethrough to the underlying base, and maintaining said surface layer of cement mortar sufficiently moist until the initial set has occurred to preserve a superficial gloss on the said surface layer when completely set and hardened.

4. The process for producing a glazed-like mortar coating on the surface of a cement construction which consists in first moistening the surface of said cement construction and then pneumatically applying a superficial coating of liquid cement mortar to the surface to be treated in order to form thereon a dense surface layer which resists the penetration of moisture therethrough to the underlying base, and maintaining said surface layer of cement mortar sufficiently moist until the initial set has occurred to preserve a superficial gloss on the said surface layer when completely set and hardened.

5. The process which consists in causing a pneumatically propelled body of liquid cement mortar to impinge against the moistened surface of a suitable base, and preventing the evaporation of the vehicle of said mortar until the initial set of the same has occurred, whereby a dense, lustrous coating is formed on said surface.

6. The process which consists in causing a pneumatically propelled body of liquid cement mortar to impinge against the moistened surface of a suitable cement construction, and preventing the evaporation of the vehicle of said mortar until the initial set of the same has occurred, whereby a dense, lustrous coating is formed on said construction.

In testimony whereof I affix my signature in presence of two witnesses.

ANTON WEITHALER.

Witnesses:
ERNEST L. IVES,
W. W. SCHMIZ.